(12) United States Patent
Krause et al.

(10) Patent No.: US 8,985,356 B2
(45) Date of Patent: Mar. 24, 2015

(54) ELECTRIC COUPLING FOR RAILWAYS

(75) Inventors: Jens Krause, Neumarkt in der Oberpfalz (DE); Joerg Hehlgans, Diekholzen (DE)

(73) Assignee: Harting Electric GmbH & Co. KG (DE)

( * ) Notice: Subject to any disclaimer, the term of this patent is extended or adjusted under 35 U.S.C. 154(b) by 161 days.

(21) Appl. No.: 13/822,994

(22) PCT Filed: Aug. 18, 2011

(86) PCT No.: PCT/EP2011/004165
§ 371 (c)(1),
(2), (4) Date: Mar. 13, 2013

(87) PCT Pub. No.: WO2012/034630
PCT Pub. Date: Mar. 22, 2012

(65) Prior Publication Data
US 2013/0196519 A1 Aug. 1, 2013

(30) Foreign Application Priority Data
Sep. 17, 2010 (DE) .......................... 10 2010 045 742

(51) Int. Cl.
*B61G 5/10* (2006.01)
*H04B 5/00* (2006.01)
*H01Q 1/32* (2006.01)
*H01Q 7/00* (2006.01)

(52) U.S. Cl.
CPC ................ *B61G 5/10* (2013.01); *H04B 5/0031* (2013.01); *H04B 5/0093* (2013.01); *H01Q 1/32* (2013.01); *H01Q 7/00* (2013.01)
USPC ...................................................... 213/75 R

(58) Field of Classification Search
CPC .............. B61G 5/10; B61G 5/06; B61G 5/00; H04B 5/0093; H04B 5/00; H04B 5/0012; H04B 5/0031; H04B 5/0081; H01Q 7/00
USPC ................ 213/1.3, 1.6, 75 D, 75 R; 343/711; 439/34; 246/187 C
See application file for complete search history.

(56) References Cited

U.S. PATENT DOCUMENTS

| 5,435,505 A | 7/1995 | Martin ........................ 246/187 |
| 6,264,048 B1 | 7/2001 | Ramnialis et al. ............. 213/1.3 |
| 7,345,639 B2 | 3/2008 | Prill et al. ..................... 343/711 |

(Continued)

FOREIGN PATENT DOCUMENTS

| CN | 1246425 | 3/2000 | .............. B61B 12/00 |
| CN | 101626936 | 1/2010 | ............... B61G 5/10 |

(Continued)

OTHER PUBLICATIONS

International Search Report issued in corresponding application No. PCT/EP2011/004165, dated Nov. 17, 2011 (6 pgs).

(Continued)

*Primary Examiner* — Mark Le
(74) *Attorney, Agent, or Firm* — Hayes Soloway P.C.

(57) ABSTRACT

An electric coupling for railways contains a first and a second coupling part each comprising a support in which a plurality of linking parts are arranged for establishing an electric, pneumatic and/or hydraulic link from one coupling part to another coupling part. In addition, at least one high-frequency link is provided which is formed by an enclosed antenna in one coupling part and by an enclosed antenna in the other coupling part.

6 Claims, 15 Drawing Sheets

(56) References Cited

U.S. PATENT DOCUMENTS

| | | | |
|---|---|---|---|
| 7,458,477 B2 * | 12/2008 | Jones | 213/1.3 |
| 8,070,057 B2 * | 12/2011 | Jain et al. | 235/380 |
| 8,348,074 B2 | 1/2013 | Dahlstrom et al. | 213/1.3 |
| 2007/0054562 A1 * | 3/2007 | Prill et al. | 439/676 |
| 2009/0195344 A1 * | 8/2009 | Marvel et al. | 336/200 |

FOREIGN PATENT DOCUMENTS

| | | | | |
|---|---|---|---|---|
| DE | 102004037849 | 7/2005 | | B61G 5/10 |
| DE | 102007053497 | 5/2009 | | B61G 5/10 |
| EP | 1762455 | 3/2007 | | B61G 5/10 |
| WO | WO03028299 | 4/2003 | | H04L 12/28 |
| WO | WO2005113313 | 12/2005 | | B61G 5/10 |
| WO | WO2006013638 | 2/2006 | | H01R 13/66 |
| WO | WO2007079501 | 7/2007 | | |

OTHER PUBLICATIONS

International Preliminary Report on Patentability (English translation) issued in corresponding application No. PCT/EP2011/004165, dated Mar. 19, 2013 (7 pgs).

English translation of First Chinese Office Action issued in related Chinese Appln. No. 201180044376.7 dated Nov. 2, 2014 (7 pgs).

* cited by examiner

Fig. 8
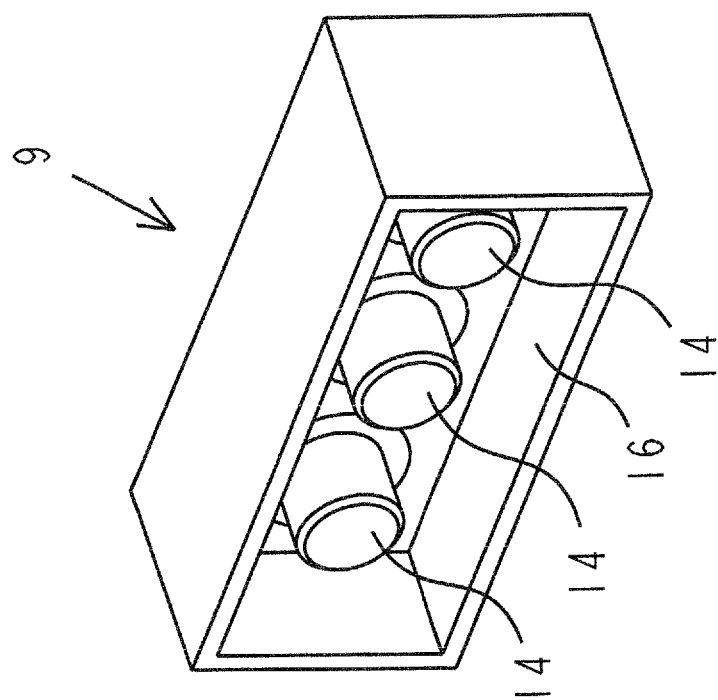
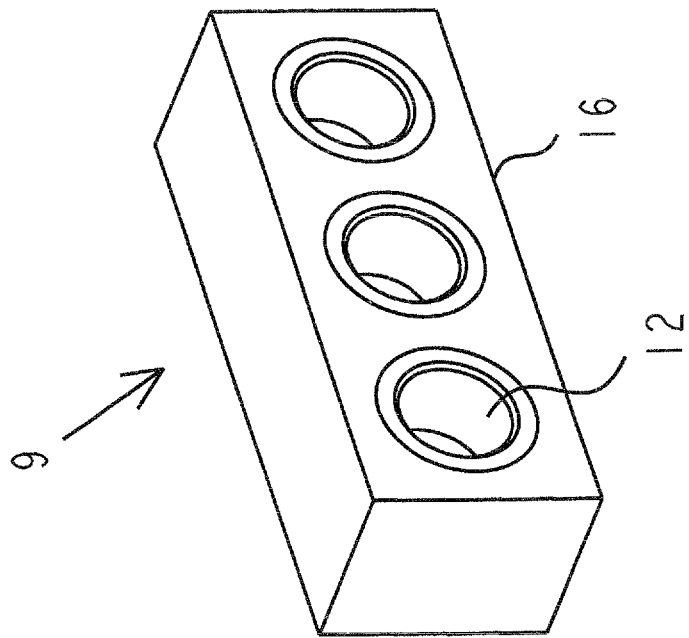

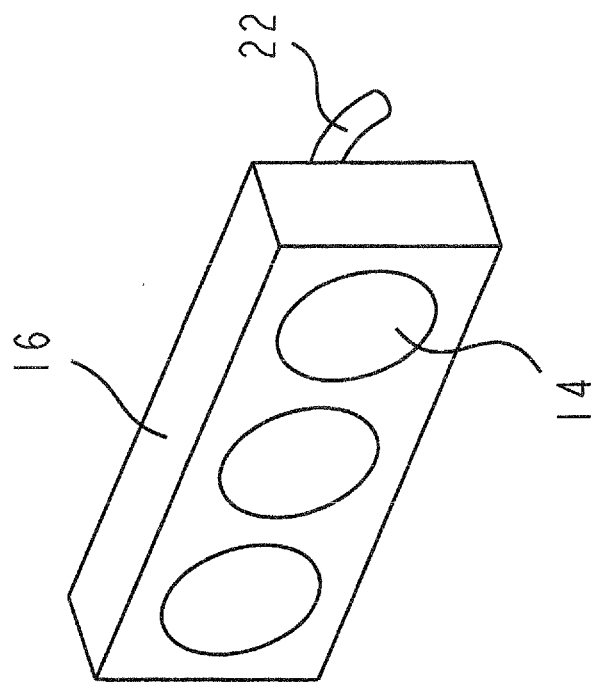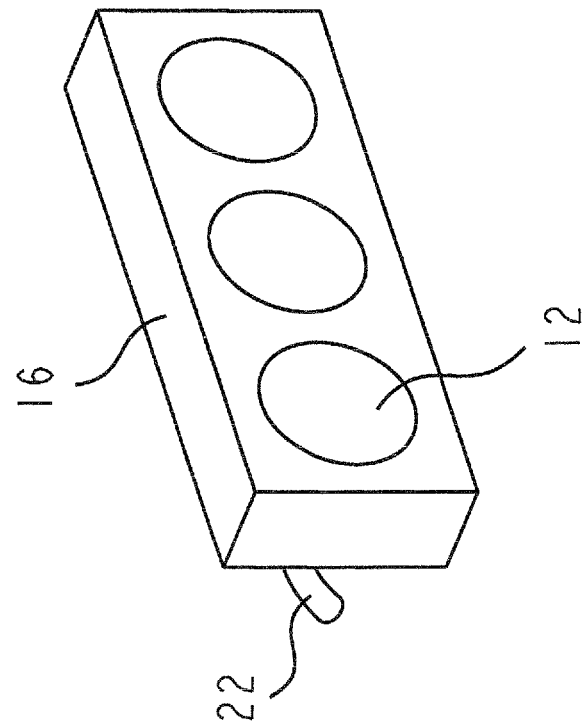
Fig. 13

ELECTRIC COUPLING FOR RAILWAYS

BACKGROUND OF THE INVENTION

The invention relates to an electric coupling for railways, having a first and a second coupling part each comprising a support in which a plurality of linking parts are arranged by means of which an electric, pneumatic and/or hydraulic link can be established from one coupling part to another coupling part.

In modern trains, such an electric coupling is arranged next to the mechanical coupling which connects the carriages of a train or the railcars of train parts. Via the electric coupling, electric, pneumatic and/or hydraulic connections are then established between the carriages of a train or from one railcar to the next railcar.

In the recent past, there is an increased need for a high-frequency data transmission from carriage to carriage or from railcar to railcar. On the one hand, control commands can in this way be transmitted from one railcar to the next one. On the other hand, multimedia contents which can be offered to the passengers can also be transmitted by a data transmission of this type.

It is basically known that the high-frequency data transmission can be realized by plugs, as known for example from Ethernet cables. Such plug connectors are however not suitable for use in railways, as they would become inoperative very quickly due to the unavoidable impurities in case of a connection from one carriage to the other. Different suggestions are therefore known in the state of the art to establish the high-frequency data transmission by means of a radio link from one carriage to the other one, or from one railcar of a train part to the railcar of a second train part. The drawback consists here in that comparatively large distances are to be overcome from carriage to carriage, and much more from one railcar to the next one, which lead to problems with respect to the security against eavesdropping and the susceptibility to be interfered from the outside. In the data transmission from one railcar to the next one, the problem furthermore arises that the antenna required for the data transmission has to be mounted in the vehicle structure, which leads to difficulties with respect to the structural rigidity and the electric linking of the antenna.

SUMMARY OF THE INVENTION

The object of the invention thus consists in providing a possibility for a high-frequency data transmission between the carriages of a train or the railcars of different train parts, which is suitable for practice.

To achieve this object, a high-frequency link is provided according to the invention in an electric coupling of the type initially mentioned, which is formed by an enclosed antenna in one coupling part and by an enclosed antenna in the other coupling part. The invention is based on the basic idea to provide a high-frequency link for the high-frequency data transmission where the other connections are also established from carriage to carriage or from railcar to railcar, namely in the electric coupling. It is thus not necessary to provide openings for separate antennas etc. in the vehicle structure, and it is not necessary, either, to cable a separate antenna. The high-frequency data transmission occurs without any galvanic link. This is particularly advantageous in view of the unavoidable dirt and effects of humidity in the region of the electric coupling. A short radio link as realized between the two antennas which is in the order of millimeters or a few centimeters is practically immune to dirt or humidity. The short radio link furthermore permits by an appropriate adjusting of sensitivity and transmitting power to ensure the security against eavesdropping. To dispense with a galvanic link also eliminates the risk that high compensation currents flow via the shielding of the high-frequency data transmission, which could result in a damage or even a destruction of the data transmission path.

It is preferably provided that the antennas each are magnetic antennas. The term "magnetic antenna" refers here to an antenna in which the data transmission is substantially, thus mainly performed by the magnetic field sent or received rather than by a sent or received electric field. Such magnetic antennas are preferably configured as flat antennas, which is advantageous in view of the space required, and they are in particular configured as an antenna loop or a "loop antenna". A magnetic antenna offers the advantage that the magnetic fields decrease more quickly than comparable electric fields of patch or dipole antennas, for example. The magnetic fields used for the data transmission are furthermore largely insensitive to humidity, snow and ice, which has a very advantageous effect on the transmission security when used in railways.

According to one embodiment of the invention, it is provided that the high-frequency link is formed by two cooperating high-frequency linking parts which are each configured as a plastic body which entirely encompasses the antenna. In this configuration, the high-frequency link is formed on the mechanical level by the two high-frequency linking parts which engage each other, as a result of which the two antennas are brought in a position relative to each other, in which the high-frequency data transmission takes place. The advantage of this configuration is that the antennas are in a defined position relative to each other when the two high-frequency linking parts engage each other. A very robust design if furthermore obtained, which ensures a similarity in the mountability.

The reception can be configured as a bushing and the projection as a pin which is inserted into the bushing when the electric coupling is closed, such that the two antennas are at least approximately in one plane. This ensures a self-centering and a precise position of the antennas relative to each other. Alternatively, it can be provided that the reception has a conical recess and that the projection if configured as a cone. In this way, the self-centering is also achieved in case of larger deviations of position from the desired position.

According to an alternative embodiment, it is provided that the two high-frequency linking parts of a high-frequency link are configured as obtuse projections which are directly opposite each other when the electric coupling is closed, such that the two antennas are arranged at a small distance opposite each other. This configuration permits higher tolerances transversely to the direction of insertion.

BRIEF DESCRIPTION OF THE DRAWINGS

The invention will be described below with reference to different embodiments which are represented in the accompanying drawings, in which:

FIG. 8 shows the electric coupling of FIG. 7 with the high-frequency linking parts mounted therein;

FIG. 13 shows in a perspective schematic view the electric coupling of FIG. 12 with the high-frequency linking parts mounted therein;

DETAILED DESCRIPTION OF THE INVENTION

Figure 1:
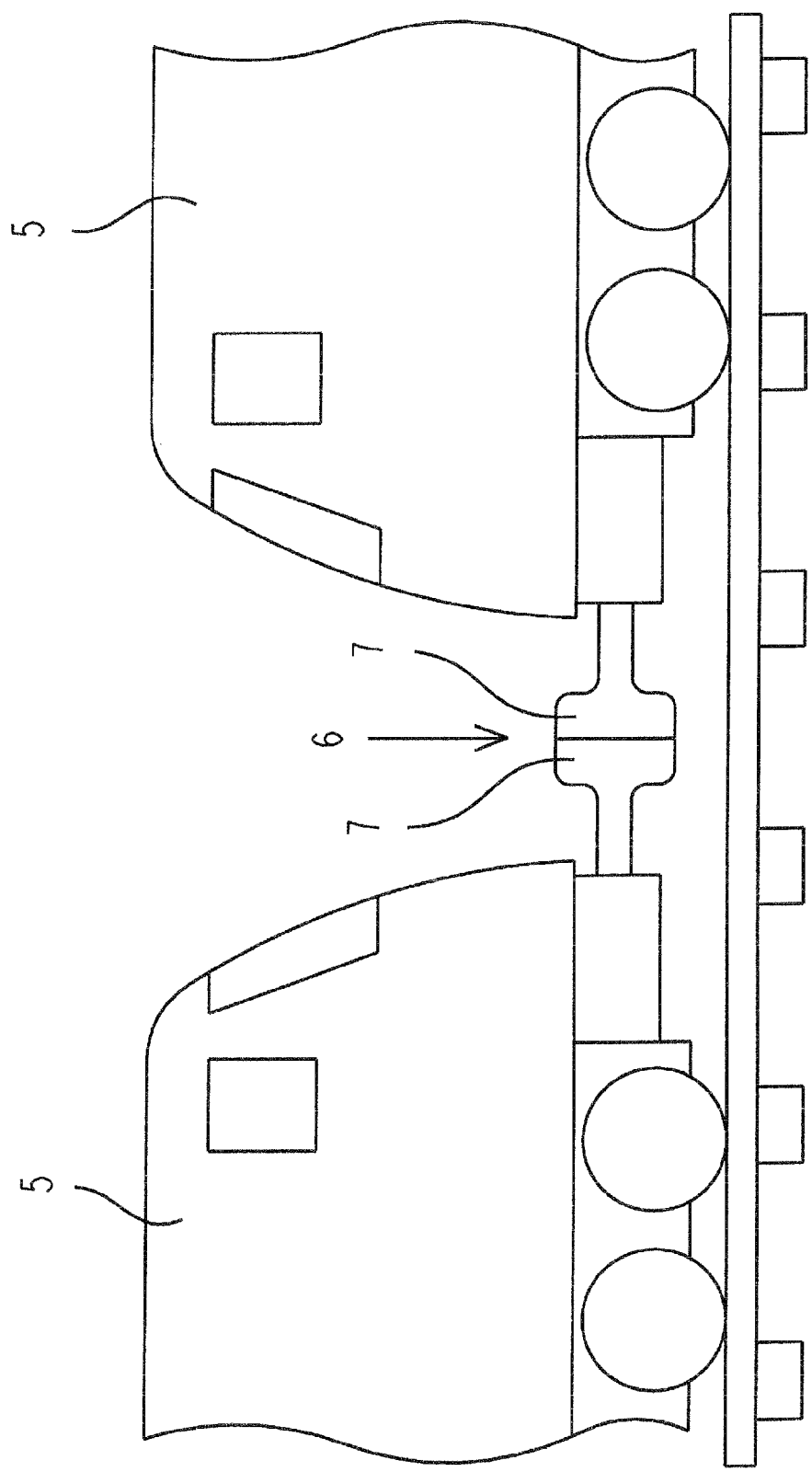
FIG. 1 schematically shows two railcars with a coupling arranged therebetween.
Figure 2:
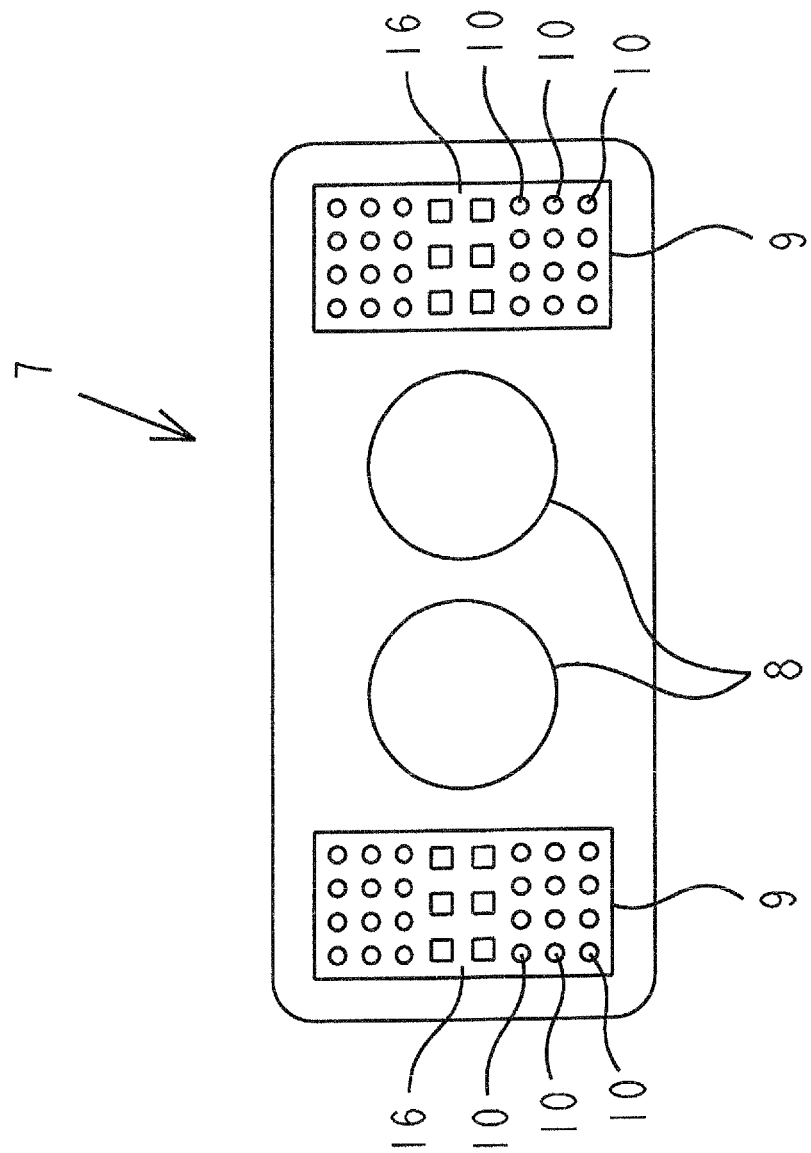
FIG. 2 shows in a schematic top view a railway coupling in which two electric couplings are provided.

FIG. 1 schematically shows a train which is composed of two train sections which are connected to each other and which each contain a railcar 5. The two railcars are connected to each other by a coupling 6 which comprises two coupling parts 7. Each coupling part 7 (cf. FIG. 2) contains a mechanical coupling 8 which is usually configured as a Scharfenberg-type automatic coupling, and an electric coupling 9. Both the mechanical coupling 8 and the electric coupling 9 can be operated in an automated manner in modern trains to establish the necessary mechanical connection and the electric, hydraulic and/or pneumatic connections necessary for control upon linking of railcars of a plurality of train parts or also of carriages of a train part to each other. To this end, a plurality of plugs is usually integrated into the electric coupling 9, which establish the respective connection upon connection of the two coupling parts of the electric coupling 9.

Figure 3:
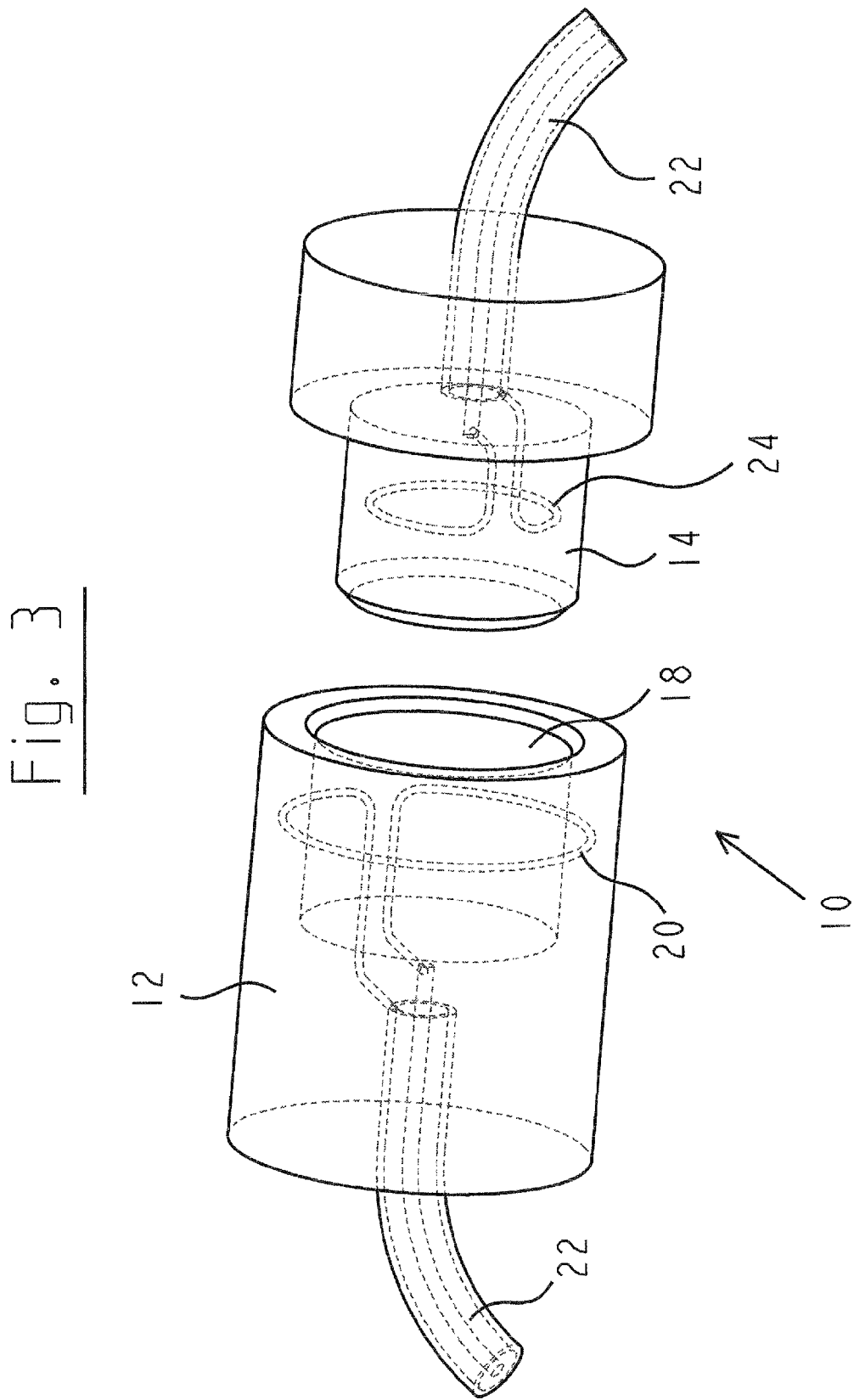
FIG. 3 schematically shows two high-frequency linking parts which can form a high-frequency link in the electric coupling shown in FIG. 2.
Figure 4:
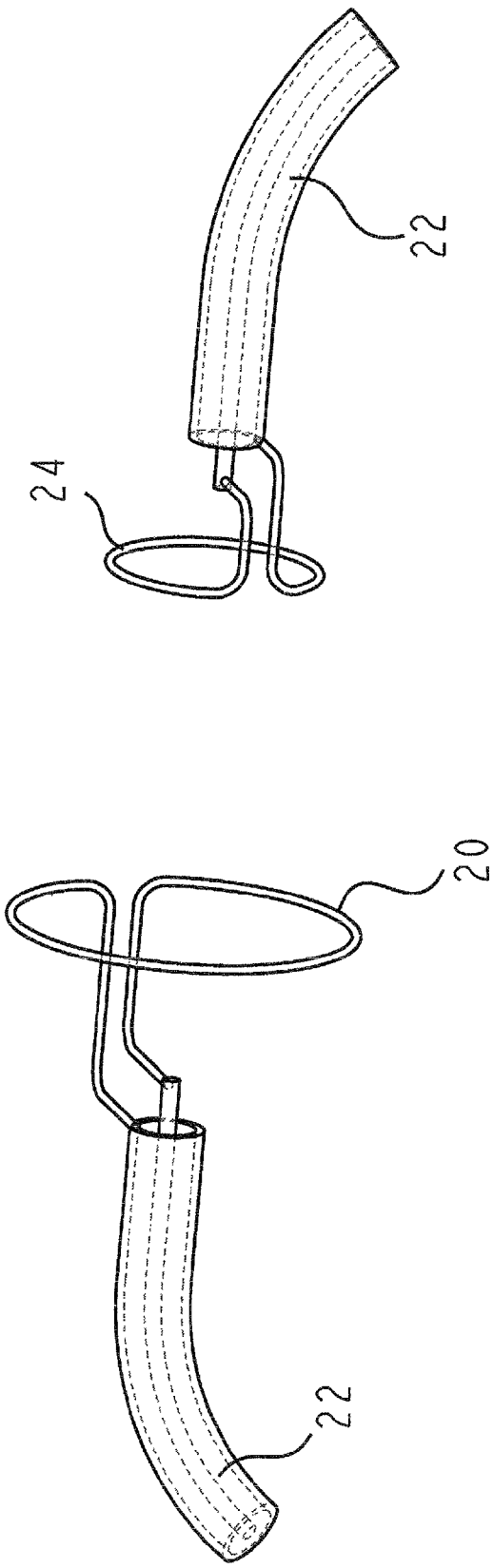
FIG. 4 shows in a perspective view the antennas used in the high-frequency link of FIG. 3.

According to the invention, it is provided that at least one high-frequency link 10 is integrated into the electric coupling. This permits to also form a high-frequency data transmission by the coupling 6 in addition to the usual, known connections between the two coupling parts 7 when the coupling 6 is closed. The high-frequency link is formed by high-frequency linking parts 12, 14 (cf. FIG. 3) which are arranged in a support 16 (cf. also FIG. 7) of a coupling part of the electric coupling 9.

In the embodiment shown in FIGS. 3 to 8, the high-frequency linking part 12 is configured as a concave reception, here specifically as a cylindrical bushing having an inner opening 18. A magnetic antenna 20 which in the present case is configured as a loop surrounding the opening 18 concentrically is arranged encapsulated in the material of the bushing 12. The antenna 20 is connected by a coaxial cable. 22.

In the first embodiment, the second high-frequency linking part 14 is configured as a projection, here specifically as a cylindrical pin which can be inserted into the reception of the other high-frequency linking part 12, thus into the opening 18. A magnetic antenna 24 is received within the pin 14, which is also connected to a coaxial cable 22. The antenna 24 is also formed by an antenna loop and is similarly to the antenna 20 a flat antenna. Both the pin 14 and the edge of the opening 18 are each provided with insertion bevels to facilitate the insertion of the pin into the opening.

Figure 5:
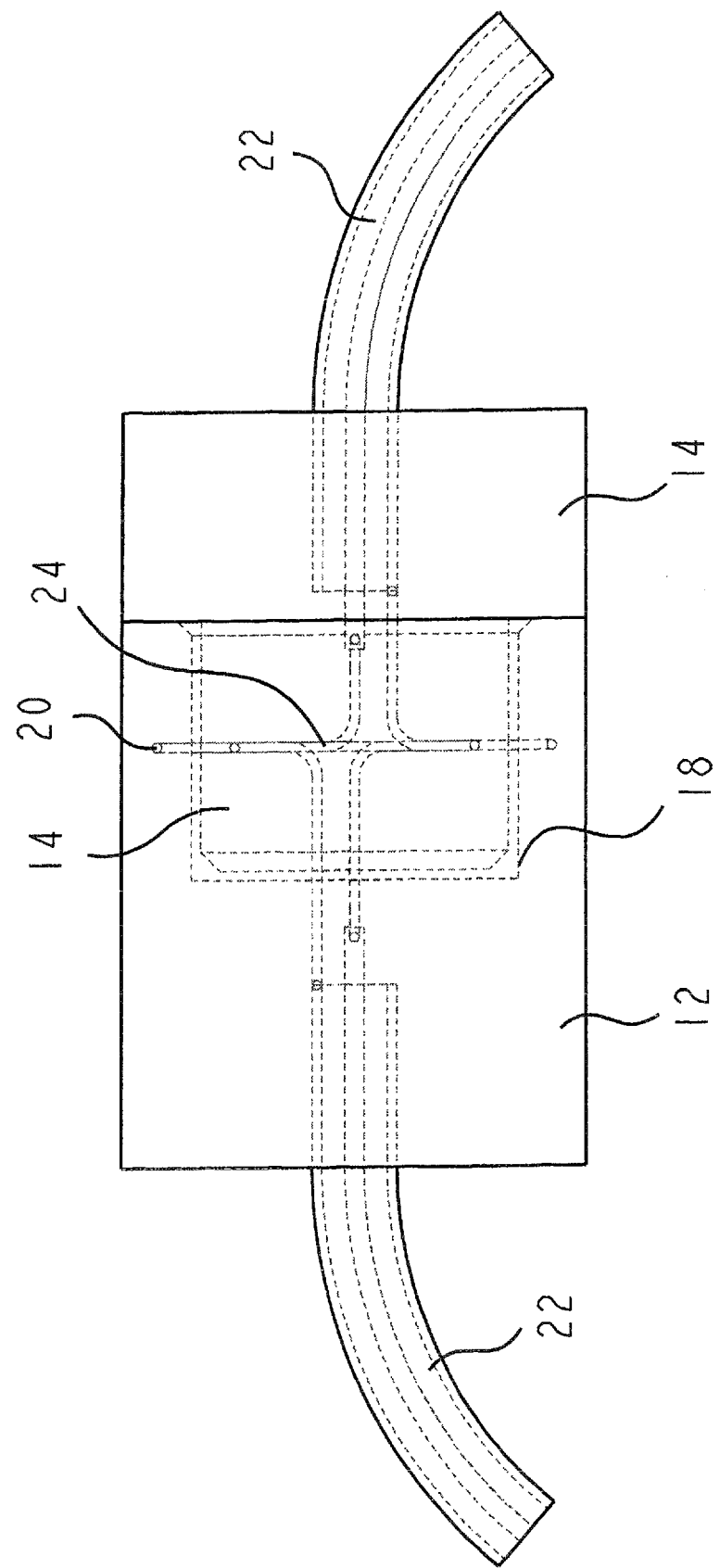
FIG. 5 shows in a schematic view the high-frequency link of FIG. 3 in the plugged state.
Figure 6:
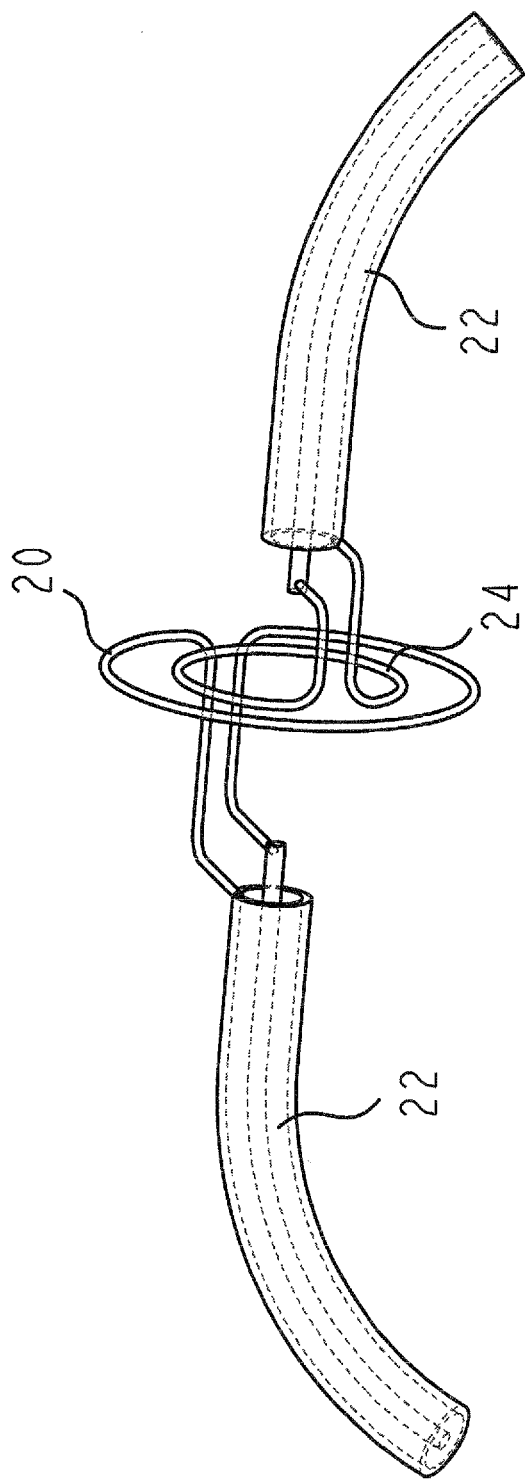
FIG. 6 shows the position of the antennas of the high-frequency link of FIG. 3 in the plugged state.

As can be seen in FIG. 5, the antenna 24 which is arranged in the pin 14 is placed in the same plane as the antenna 20 and within the latter when the two high-frequency linking parts 12, 14 are in the plugged state. In this way, an excellent magnetic linking with a radio link is created in the range of millimeters or of a few centimeters (cf. also FIG. 6). Depending on the geometry of the antennas and the distances, it is in this way possible to form a mainly inductive link between the two antennas.

The high-frequency linking parts 12, 14 are made of an appropriate plastic material which is suitable for the high-frequency signal transmission with respect to its dielectric properties. The high-frequency linking parts are preferably injection-molded, so that the antenna 20 or 24 is entirely encapsulated in the material of the high-frequency linking parts. A galvanic connection between the two linking parts is in this way excluded.

Figure 7:
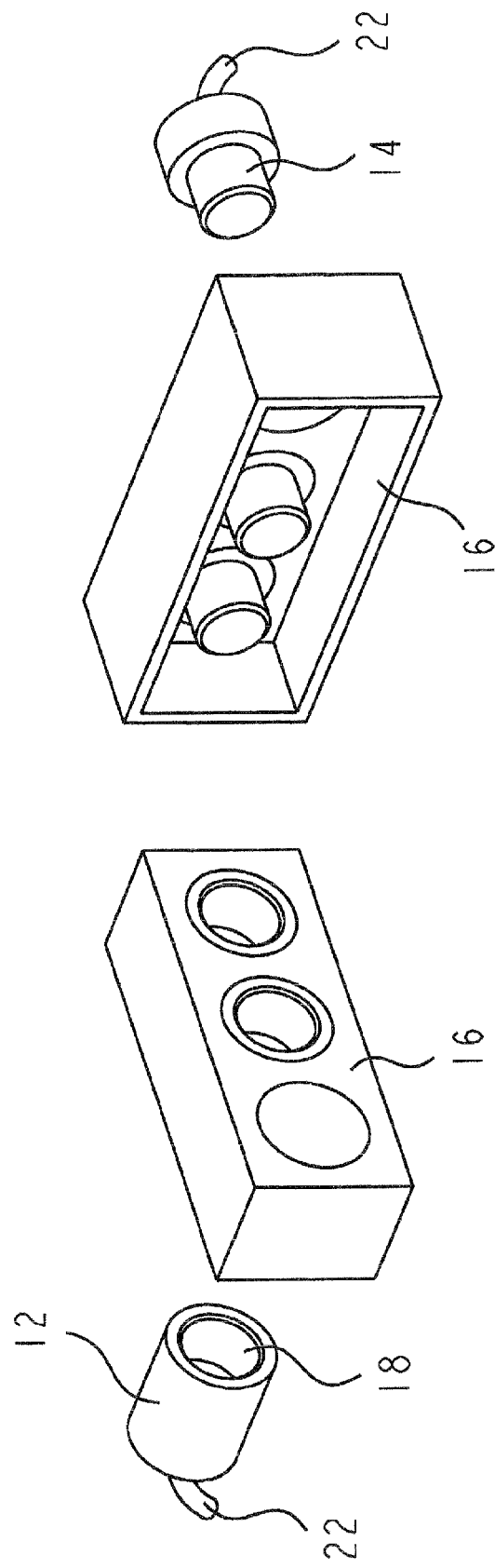
FIG. 7 schematically shows in an exploded view an electric coupling having the two high-frequency linking parts according to a first embodiment.
Figure 9:
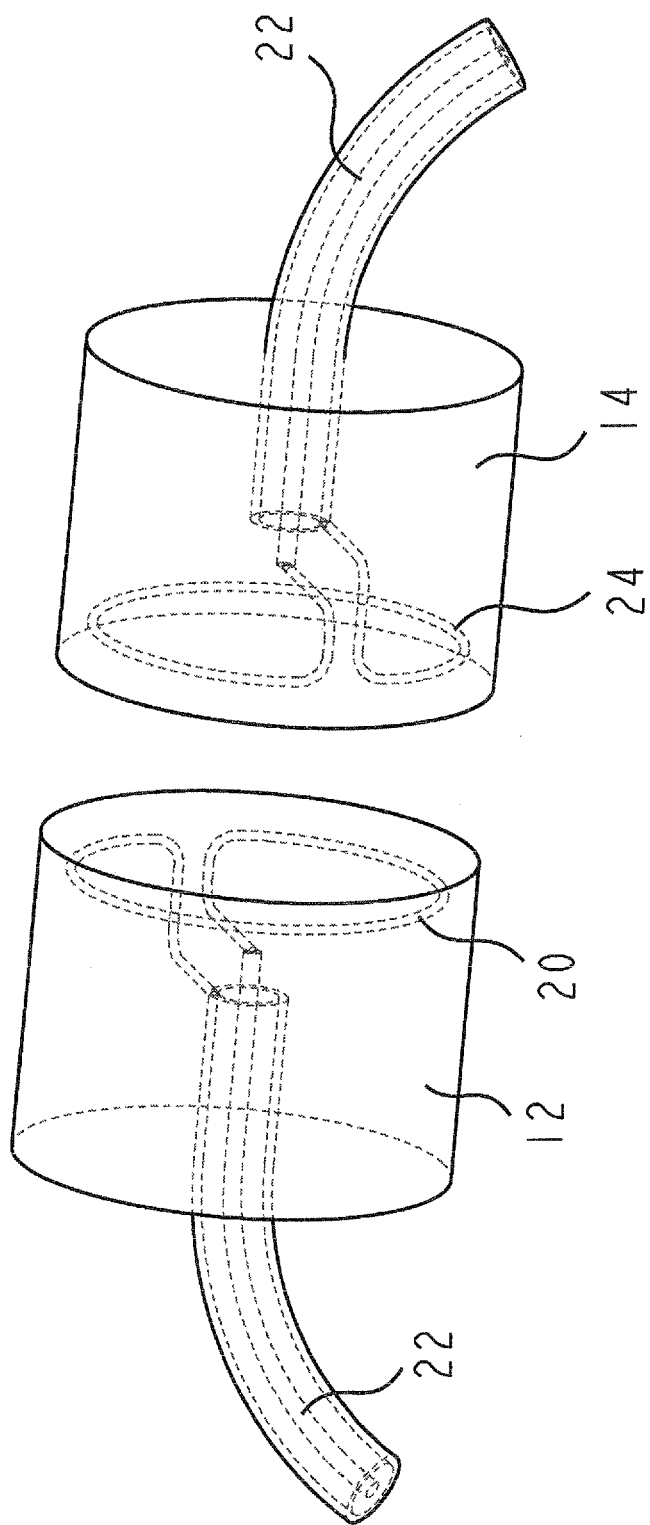
FIG. 9 shows in a perspective schematic view a high-frequency link according to a second embodiment.

As can be seen in FIGS. 7 and 8, the high-frequency link which is composed of the first and the second high-frequency linking parts 12, 14 can be mounted with little effort in appropriate recesses of the support 16 of the electric coupling 9. They can in particular be arranged at plug points which have not been used so far or which are occupied by contacts that are no longer required. This permits to upgrade electric couplings that are already in operation to the requirements of the high-frequency signal transmission, without a particular expenditure being necessary therefor. It is merely necessary to mount the high-frequency linking parts 12, 14 into the support 16 and to lead the corresponding cable from the electric coupling into the railcar or the corresponding carriage. This is however easily possible as a plurality of cables lead anyway to the electric coupling, to which the high-frequency cables for the high-frequency link can be added.

Depending on the requirements, as many high-frequency links as necessary can be mounted in each electric coupling.

With reference to FIGS. 9 to 13, a second embodiment of the high-frequency link is now described. The same reference numbers are used for the components known from the first embodiment, and in this respect, reference is made to the explanations above.

The difference between the first and the second embodiment consists in that in the second embodiment, the two high-frequency linking parts do not engage each other but are arranged such that their front faces are opposite each other in an obtuse manner. To this end, each high-frequency linking part 12, 14 is configured in the manner of a projection, in the present case as a circular cylindrical block in which the antenna 20 or 24, respectively is embedded. In contrast to the first embodiment, the two antennas 20, 24 have here the same diameter.

Figure 10:
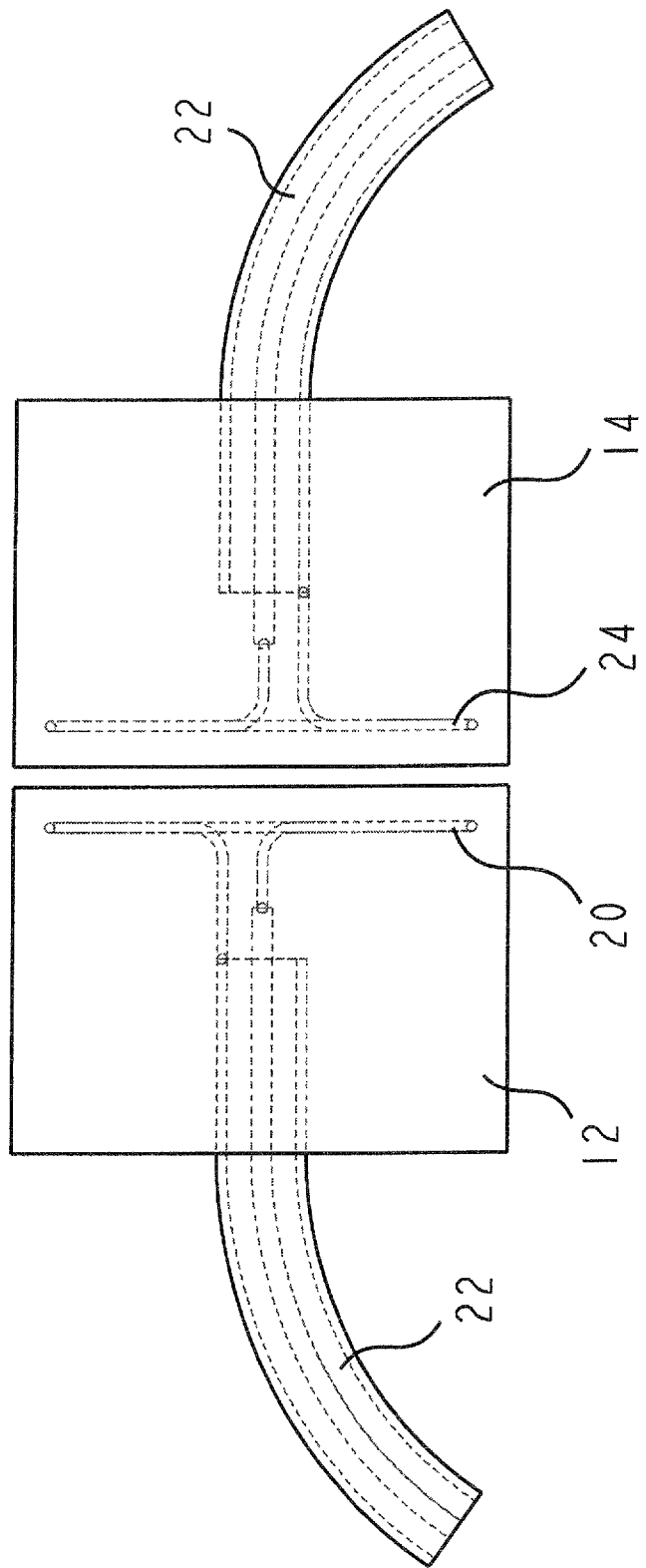
FIG. 10 shows in a schematic view the high-frequency link according to the second embodiment in the linked state.
Figure 11:
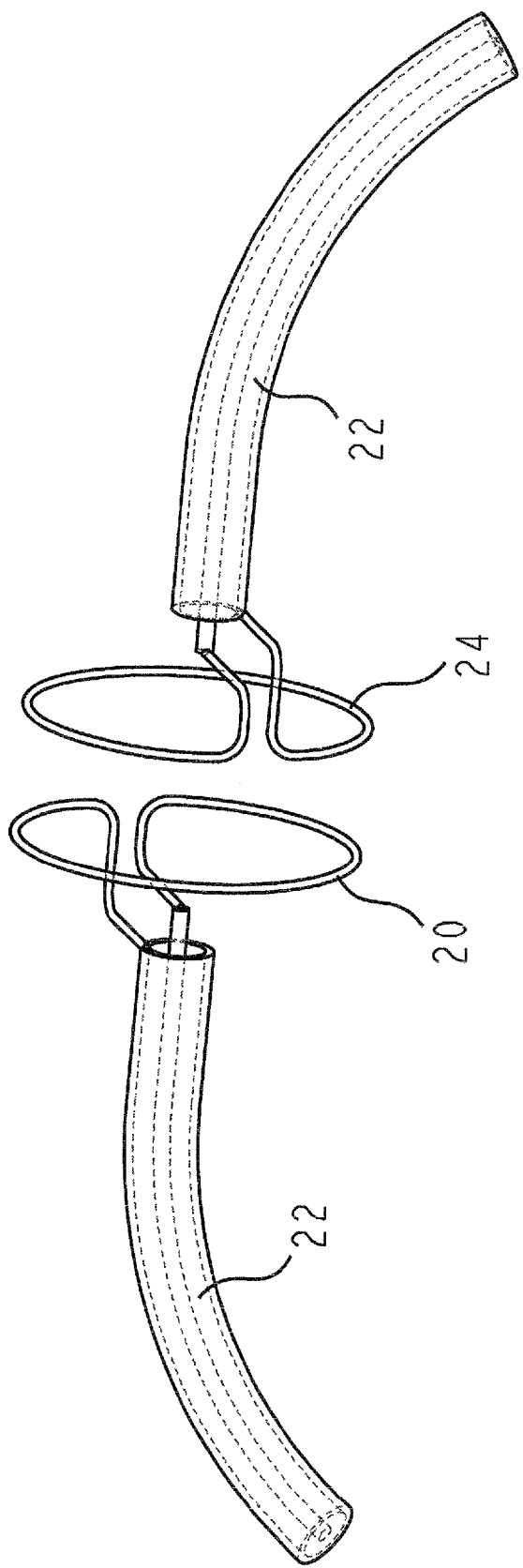
FIG. 11 shows in a perspective view the antennas of FIG. 9.
Figure 12:
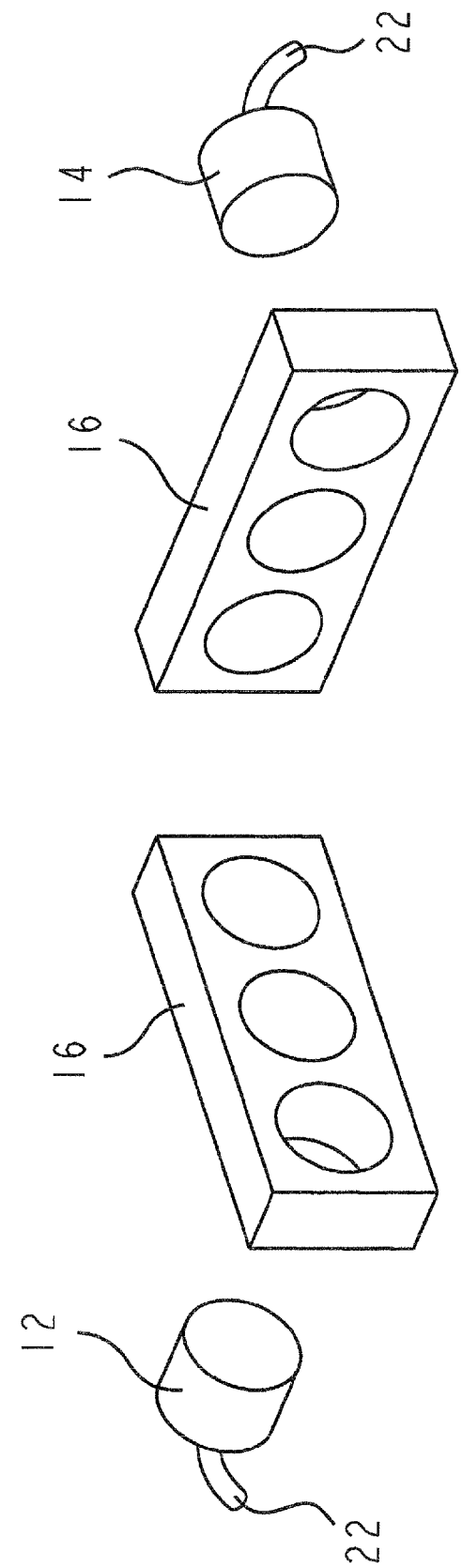
FIG. 12 shows in a schematic exploded view an electric coupling having two high-frequency linking parts according to the second embodiment.

As can be seen in FIGS. 10 and 11, the two antennas 20, 24 are arranged opposite each other so as to be oriented parallel to each other when the two high-frequency linking parts 12, 14 are opposite each other in the signal transmission position, the distance perpendicularly to the extension planes also amounting only to a few millimeters or centimeters. The signal transmission is here also mainly performed by the magnetic link between the two antennas 20, 24.

Figure 14:
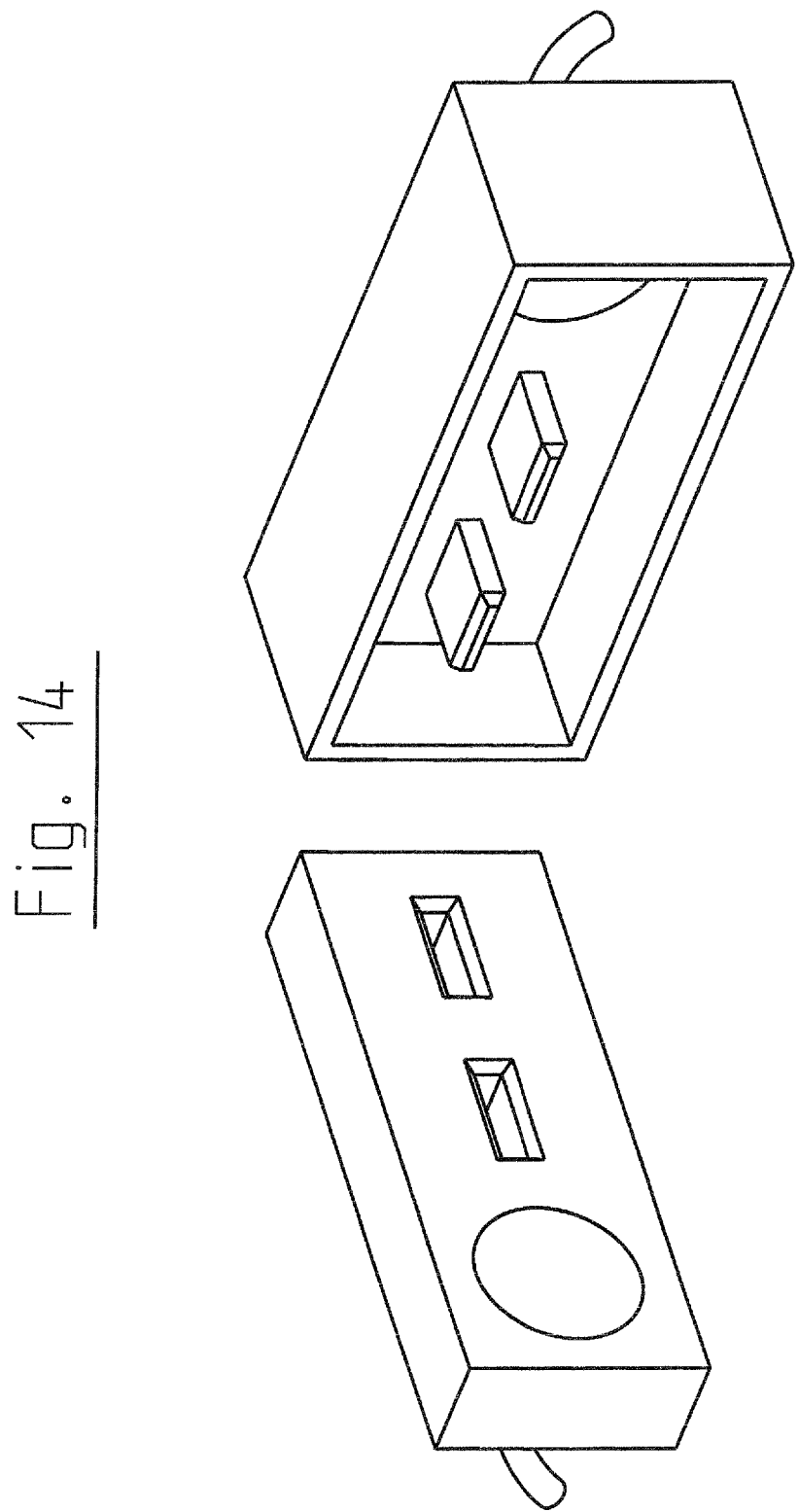
FIG. 14 shows an alternative configuration of an electric coupling having a high-frequency link according to the second embodiment.

In FIG. 13, it can be seen that several high-frequency linking parts 12, 14 are arranged next to each other in each support 19. It is of course also possible to arrange the high-frequency linking parts in the support 16 next to other linking types (cf. FIG. 14), next to electric plug connectors, for example.

Figure 15:
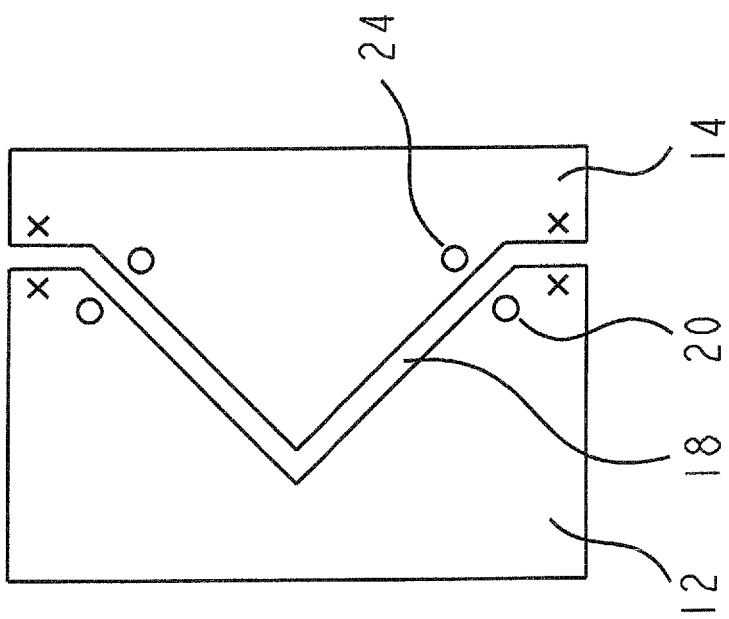
FIG. 15 shows in a schematic illustration a high-frequency link according to a third embodiment.

FIG. 15 shows a further embodiment which corresponds to the first embodiment in that the first high-frequency linking part 12 is configured as a concave reception and the second high-frequency linking part 14 as a projection. In contrast to the first embodiment, the first high-frequency linking part 12 of the third embodiment has a conical reception 18, whereas the projection of the second high-frequency linking part 14 is configured as a complementary cone. In this embodiment, the two antennas 20, 24 are also arranged in the same plane when the two high-frequency linking parts 12, 14 are plugged into each other. It is alternatively also conceivable to configure the antennas with the same diameter and to arrange them such that they are opposite to each other in a parallel manner, similarly to the second embodiment. A corresponding position of the antennas is indicated in FIG. 15 by means of the crosses.

The invention claimed is:

1. An electric coupling for railways, having a first and a second coupling part each comprising a support in which a plurality of linking parts are arranged so that an electric, pneumatic and/or hydraulic link can be established from one coupling part to another coupling part, wherein at least one high-frequency link is provided which is formed by a first flat antenna enclosed in the first coupling part and by a second flat antenna enclosed in the second coupling part, wherein the first coupling part and the second coupling part have first and second flat engaging surfaces which are in direct contact with one another, and wherein the first flat antenna and the second flat antenna are oriented approximately parallel to the first and second engaging surfaces, wherein the high frequency link comprises two cooperating high-frequency linking parts which are each configured as a plastic body which entirely encompasses the antenna, wherein one of the high-frequency linking parts of a high-frequency link is configured as a concave reception and the other as a complementary projection which comes to rest in the reception when the electric couplin is closed such that the two antennas come to rest at a small distance from each other, and wherein the reception is configured as a bushing and the projection as a pin which is inserted into the bushing when the electric coupling is closed, such that the two antennas are arranged at least approximately in one plane.

2. The electric coupling according to claim 1, wherein the antennas are magnetic antennas.

3. The electric coupling according to claim 1, wherein the antennas are formed by antenna loops.

4. The electric coupling according to claim 1, wherein the bushing and/or the pin is provided with insertion bevels.

5. An electric coupling for railways, having a first and a second coupling part each comprising a support in which a plurality of linking parts are arranged so that an electric, pneumatic and/or hydraulic link can be established from one coupling part to another coupling part, wherein at least one high-frequency link is provided which is formed by a first flat antenna enclosed in the first coupling part and by a second flat antenna enclosed in the second coupling part, wherein the first coupling part and the second coupling part have first and second flat engaging surfaces which are in direct contact with one another, and wherein the first flat antenna and the second flat antenna are oriented approximately parallel to the first and second engaging surfaces, wherein the antennas are magnetic antennas, wherein the high frequency link comprises two cooperating high-frequency linking parts which are each configured as a plastic body which entirely encompasses the antenna, wherein one of the high-frequency linking parts of a high-frequency link is configured as a concave reception and the other as a complementary projection which comes to rest in the reception when the electric coupling is closed, such that the two antennas come to rest at a small distance from each other, and wherein the reception has a conical recess and the projection is configured as a cone.

6. The electric coupling according to claim 5, wherein the high frequency link comprises two cooperating high-frequency linking parts which are each configured as a plastic body which entirely encompasses the antenna.

* * * * *

UNITED STATES PATENT AND TRADEMARK OFFICE
CERTIFICATE OF CORRECTION

PATENT NO. : 8,985,356 B2  
APPLICATION NO. : 13/822994  
DATED : March 24, 2015  
INVENTOR(S) : Krause et al.

Page 1 of 1

It is certified that error appears in the above-identified patent and that said Letters Patent is hereby corrected as shown below:

In the Claims

Claim 1, Col. 5, line 36, "couplin" should be --coupling--.

Claim 1, Col. 5, line 37, "closed such" should be --closed, such--.

Signed and Sealed this  
Seventh Day of July, 2015

Michelle K. Lee  
*Director of the United States Patent and Trademark Office*